United States Patent
Merboth et al.

(10) Patent No.: US 8,320,951 B2
(45) Date of Patent: Nov. 27, 2012

(54) POWER SHARING PROCESS IN CELLULAR NETWORK ARCHITECTURE

(75) Inventors: Lawrence J. Merboth, Bridgewater, NJ (US); Pengfei Zhu, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 1638 days.

(21) Appl. No.: 10/799,815

(22) Filed: Mar. 12, 2004

(65) Prior Publication Data

US 2005/0202839 A1 Sep. 15, 2005

(51) Int. Cl.
- H04W 72/00 (2009.01)
- H04B 7/00 (2006.01)
- H04B 7/185 (2006.01)

(52) U.S. Cl. ........... 455/522; 455/452.1; 370/318

(58) Field of Classification Search ........... 455/554.2, 455/561, 127, 115.1, 450, 522, 452.1; 370/318
See application file for complete search history.

(56) References Cited

U.S. PATENT DOCUMENTS

| | | | |
|---|---|---|---|
| 6,449,489 B1 | 9/2002 | Lu et al. | 455/506 |
| 6,519,462 B1 | 2/2003 | Lu et al. | 455/453 |
| 6,631,123 B1 | 10/2003 | Jiang et al. | 370/335 |
| 6,973,315 B1* | 12/2005 | Miernik et al. | 455/452.2 |
| 7,043,270 B2* | 5/2006 | Judd et al. | 455/561 |
| 7,286,845 B2* | 10/2007 | Boariu et al. | 455/522 |
| 2001/0016503 A1* | 8/2001 | Kang | 455/561 |
| 2001/0036849 A1* | 11/2001 | Mortensen et al. | 455/572 |
| 2003/0022639 A1* | 1/2003 | Hongo et al. | 455/116 |
| 2003/0060209 A1* | 3/2003 | Bruin et al. | 455/452 |
| 2003/0086405 A1* | 5/2003 | Silva et al. | 370/342 |
| 2003/0125039 A1* | 7/2003 | Lachtar et al. | 455/453 |
| 2004/0023622 A1* | 2/2004 | Mantha et al. | 455/115.1 |
| 2004/0203743 A1* | 10/2004 | Macridis et al. | 455/427 |
| 2004/0253928 A1* | 12/2004 | Jeon et al. | 455/68 |
| 2005/0111431 A1* | 5/2005 | Gotesman et al. | 370/347 |
| 2005/0260997 A1* | 11/2005 | Korale et al. | 455/452.2 |

FOREIGN PATENT DOCUMENTS

| | | |
|---|---|---|
| EP | 1085675 A2 | 3/2001 |
| EP | 1087543 A1 | 3/2001 |
| EP | 1087544 A2 | 3/2001 |
| EP | 1154667 A2 | 11/2001 |
| EP | 1187409 A1 | 3/2002 |

* cited by examiner

Primary Examiner — Andrew Wendell
(74) Attorney, Agent, or Firm — Fletcher Yoder

(57) ABSTRACT

A power sharing process for base station to allocate un-utilized power from a 1x system to an EVDV system is shown. In this process, a power sharing module receives input signals that relate to predicted power allocation for the 1x system and current power allocations for the 1x system and the EVDV system. From these input signals, the power sharing module may determine whether non-utilized power from the 1x system may be allocated to the EVDV system. The power sharing module may provide an indication corresponding to the determination to a scheduler that may allocate the non-utilized power for different forward channels. This technique allows the non-utilized power to be used by the EVDV system to operate the cellular communication system.

20 Claims, 4 Drawing Sheets

POWER SHARING PROCESS IN CELLULAR NETWORK ARCHITECTURE

BACKGROUND OF THE INVENTION

1. Field of the Invention

The present invention relates generally to wireless communications systems and, more particularly, to a power sharing process between different service systems to maximize power usage in a base station.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the past decades, wireless communication systems, sometimes referred to as mobile telephone systems or cellular telephone systems, have continued to evolve. Although the first mobile telephone system for the public was introduced in 1946, and improved in 1965, modern wireless technology was introduced in 1970 as advanced mobile phone service (AMPS), which became America's analog cellular standard. From the AMPS system, various digital wireless systems developed, such as personal communication services (PCS), which were introduced in the mid-1990s, as a second-generation wireless service. From the PCS systems, other technologies developed to increase the quality and capacity of the systems, such as time division multiple access (TDMA), frequency division multiple access (FDMA), code division multiple access (CDMA), and Global System for Mobile Communications (GSM).

There is currently a move to develop a global standard for wireless technology, which has been dubbed the third generation or "3G" wireless standard. It is likely that the third generation wireless technology may be an enhanced version of one of the digital wireless technologies mentioned above. It is expected that such standardization will not only lead to further increases in capacity, but also lead to lower cost and increased efficiencies due to standardized networks that may be shared amongst various cellular providers.

With wireless communications systems, the limited number of radio frequencies available for wireless services is provided by scattering multiple lower-powered transceivers throughout a metropolitan area. In other words, each transceiver defines a "cell" that communicates with the customer's cellular telephone. As the customer moves from one cell to another, the customer's cellular telephone communicates with different transceivers to maintain the wireless connection.

In any given cellular market, such as a typical metropolitan area, a wireless communication system, or cellular network, typically includes multiple base stations that are distributed throughout the market. The base stations serve the wireless communication system, and perform the functions of switching calls to the appropriate destination and maintaining the connection with the various wireless customers. As such, the typical base station may include a number of systems or components that control switching functions, call processing, channel assignments, data interfaces, tracking, paging, call hand-off, billing, power distribution and user databases. The typical base station may include a radio tower, antennas, cables, equipment, such as a baseband system and a radio frequency (RF) system, and a cabinet that houses the equipment. In addition, the base stations are typically coupled to the public switched telephone network (PSTN), which is often referred to as a land-based telephone network. The connection to the PSTN allows the cellular telephone calls to be communicated with landline telephones or other wireless networks through the PSTN.

As can be appreciated, a base station can manage the communications with multiple wireless telephones. To do so, the base station utilizes individual communication channels for each of the customer telephones. The communication channels are developed from a portion of a radio frequency spectrum for a particular wireless service. A power system in the base station provides transmission power to amplify the signals for transmission to the customer telephones. The power system may allocate the transmission power based on the transmission requirements of the various services provided to the customer telephones. As such, the power utilized to transmit the signals to the customer telephones is managed to maintain the quality of the communication channels.

For instance, the base station may transmit power for different types of technologies, such as CDMA, that provide different types services to the wireless customers. Because the power is limited in a base station, the power allocation between these technologies may cause conflict between the systems that provide these services for the different technologies. Specifically, with CDMA technology, a system may include a 1x system that provides CDMA2000 1x services, such as voice and fundamental channel (FCH)/supplemental channel (SCH) data, and an evolution data and voice (EVDV) system that provides CDMA2000 1x EVDV services, such as high speed data, to the customer telephones from the base station. The 1x system, which contains 1x channels for voice and data, is utilized in the base station along with the EVDV system, which contains high speed data channels. The systems have to share the total transmission power of the base station, which may limit the performance of one or both systems. Accordingly, power constraints for the 1x system, such as a power overload threshold or overload control limitations, may be implemented to manage the 1x and EVDV systems in the sharing of power, while maintaining the quality of the communication channels.

However, the EVDV system and 1x system may not operate on the same time intervals. The EVDV system is able to operate and allocate power within a smaller time interval than the 1x system and the EVDV system may over-allocate power that is intended for the 1x system, or vice versa. This inappropriate allocation of power by the 1x system and the EVDV system may cause a power overload or a power underutilization situation in a combined 1x and EVDV system. Thus, the combined 1x and EVDV system may not operate efficiently in the base station.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, a device for allocating power is provided. The device comprises a power sharing module and a scheduler. The power sharing module is configured to receive a plurality of signals corresponding to at least one predicted power allocation and at least one current power allocation and to determine from the plurality of signals whether a first service system corresponding to a first wireless service has un-utilized transmission power. The scheduler of a second service system corresponding to a second wireless service is configured to receive an indication to allocate the un-utilized transmission power to the second wireless service from the first wireless service and utilize the indication to allocate the un-utilized transmission power for the second wireless service.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
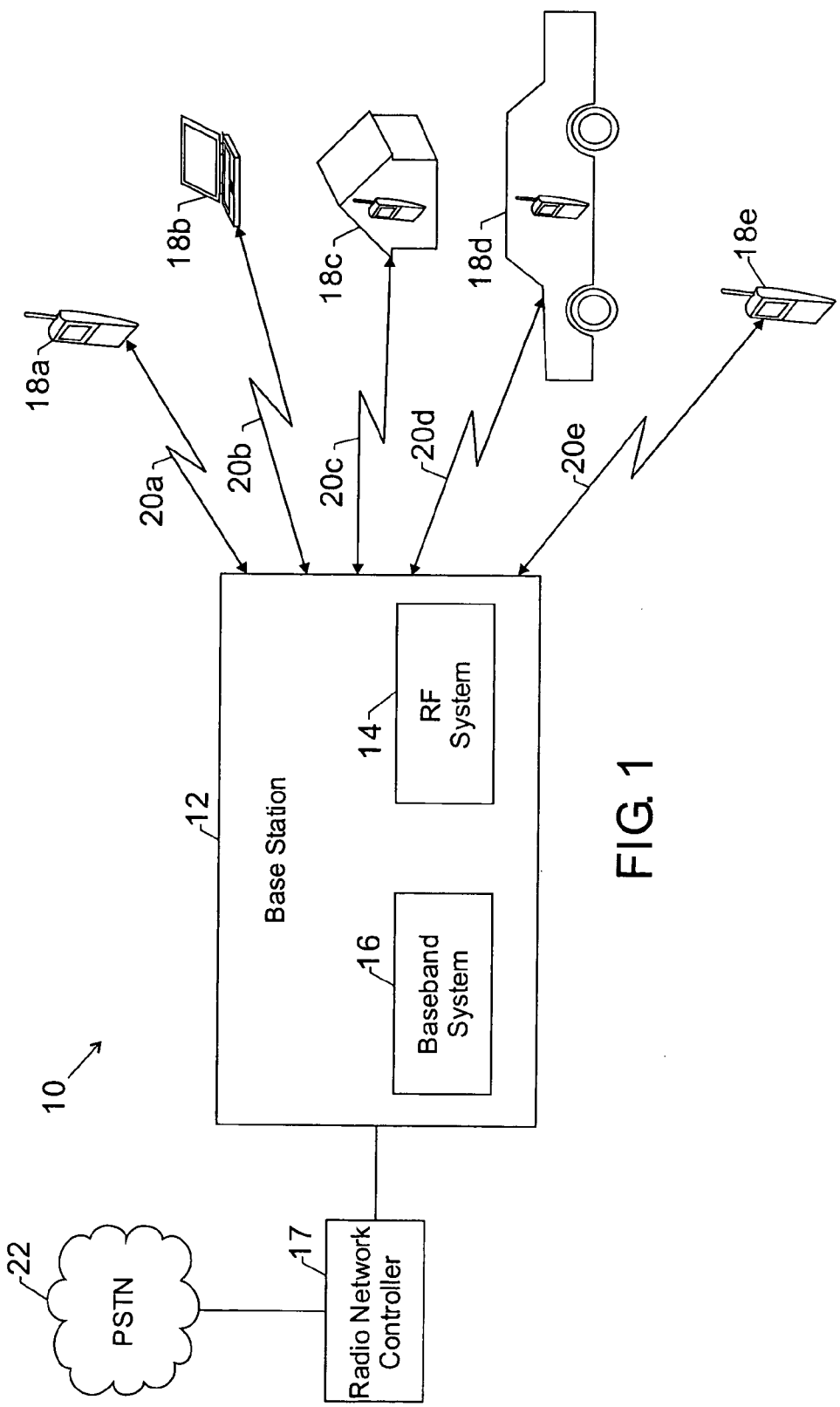
FIG. 1 illustrates an exemplary embodiment of a wireless communication system having a base station and wireless units.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As part of the current move to develop a global standard for wireless technology, which has been dubbed the third generation or "3G" wireless standard, various technologies and standards are being developed to support the global standardization. The various technologies and standards are utilized to provide enhanced services to the wireless customers. These technologies may include time division multiple access (TDMA), code division multiple access (CDMA), and Global System for Mobile Communications (GSM). Specifically, with the CDMA technology, one or more standards under development are the CDMA2000 Standards, which includes recommended minimum performance standards for cdma2000® spread spectrum base stations (ANSI/TIA-97-E-2003), over-the-air service provisioning of mobile stations in spread spectrum systems (ANSI/TIA-683-C-2003), and a CDMA 2000® Series, which are hereby incorporated by reference. These CDMA2000 standards relate to the power requirements and interaction between different systems in a base station.

The techniques disclosed herein provide an improved approach for sharing power utilized for communication channels between a 1x system and an EVDV system in a base station. The sharing of power between these systems may follow a power sharing priority or set of principles to maintain the performance of the base station. Specifically, the techniques described herein utilize a power sharing module to analyze power allocations in relation to an overload setting to determine whether un-utilized power from the 1x system may be utilized by the EVDV system. Under the present technique, the power sharing module may include a power sharing algorithm and contention avoidance algorithm that receive input signals from various modules within the base station. Using these input signals, the power sharing algorithm and contention avoidance algorithm may indicate whether power may be allocated to the EVDV system by predicting the 1x system's transitional power to maintain the overload setting within a tolerable level. This means that the power sharing module may adjust the power allocation before the 1x system has to perform any power scaling. Thus, the power sharing module may reduce 1x system overloads, prevent delays for 1x customer call admissions, prevent the blocking of soft handoffs, and/or reduce the dropping of calls for voice or dropping of packets for data.

Turning now to the drawings, and referring initially to FIG. 1, an exemplary wireless communications system is illustrated and generally referred to by reference numeral 10. In any given cellular market, such as a typical metropolitan area, a cellular network, such as the wireless communications system 10, may include one or more base stations 12. The base station 12 can communicate with multiple wireless units 18a-18e via wireless communication channels 20a-20e.

The base station 12 may take any suitable form. For example, the base station 12 may include a radio frequency (RF) system 14 and a baseband system 16. The RF system 14 typically includes antennas and transceivers (sometimes called base station radios) that communicate with wireless units 18a-18e over the wireless communication channels 20a-20e. The wireless units 18a-18e may be any suitable communications device that may communicate voice, video, and/or data, such as portable cellular telephones 18a and 18e, a computer system having wireless modem 18b, a cellular telephone in a building 18c, and/or a vehicle having mobile cellular telephone and/or navigation system 18d.

The baseband system 16, on the other hand, typically includes a processor that handles communication between the RF system 14 and a radio network controller 17. The base station 12 is typically coupled to a Public Switched Telephone Network (PSTN) 22 through the radio network controller 17. A typical wireless communications system 10 includes a connection to the PSTN 22 because a majority of all wireless telephone calls pass through the PSTN 22. The PSTN 22 may include additional switches and equipment to perform certain functions, such as routing of connections, control switching functions, call processing, data interfacing, tracking, paging, call hand-off, billing, and storing of user data.

The RF system 14 in the base station 12 may either be a distributed or centralized system. Within the RF system 14, each transceiver may be coupled to an antenna to form an RF subsystem (not shown). In a centralized RF system 14, RF subsystems may be located in the same location as the baseband system 16. The RF system 14 and the baseband system 16 may be coupled together via a network (not shown) that may include standard twisted pair, fiber optics, copper, or other suitable networks, for example. In a distributed RF system 14, the RF subsystems may be placed in multiple locations separate from the baseband system 16. The baseband system 16 may be connected to the RF subsystems via the network to provide the wireless services, such as CDMA discussed above.

Regardless of whether the RF system 14 is centralized or distributed, the baseband system 16 may manage the power to the wireless communication channels 20a-20e provided by the RF system 14. Because the baseband system 16 manages the call processing for the base station 12, the baseband system 16 may allocate power for the transmissions, and/or manage the power allocated for the transmissions, to maintain control of the limited amount of power provided to the base station 12. The baseband system 16 manages the power provided for transmissions to the wireless units 18a-18e to maintain the level of service for the wireless units 18a-18e. As such, the baseband system 16 manages the power allocations to maintain the defined levels of service or the addition of additional communication channels 20a-20e to other wireless units 18a-18e.

Figure 2:
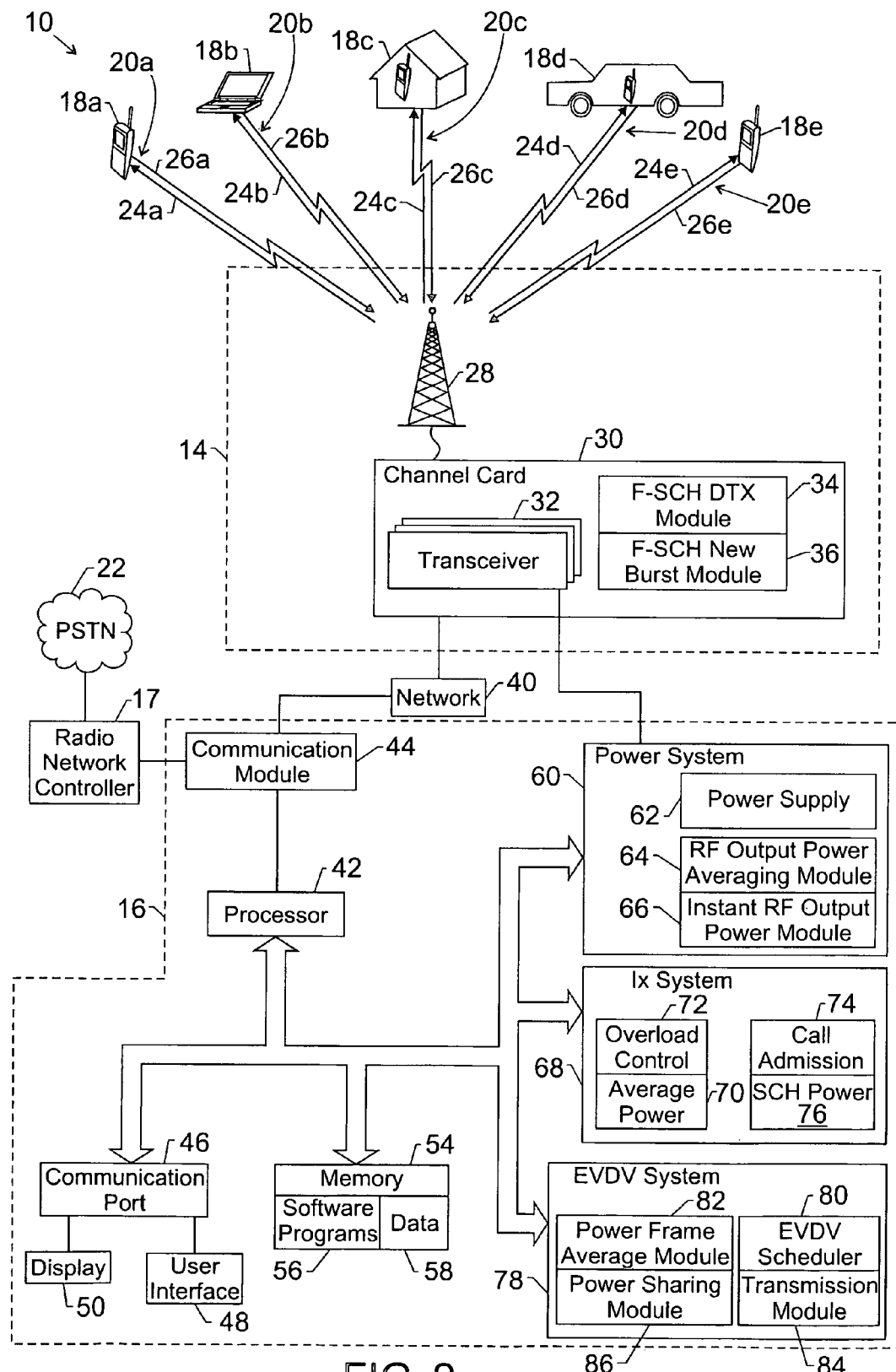
FIG. 2 illustrates an exemplary embodiment of a base station within the wireless communications system of FIG. 1.

The baseband system 16 also manages the communication links for various different technologies, such as TDMA, FDMA, CDMA, and GSM. Specifically, with CDMA, the base station 12 may provide CDMA2000 services, which is a 3G standard that provides higher capacity within the same amount of frequency spectrum. CDMA2000 includes different phases, which include a first phase of CDMA2000 1x and a second phase of CDMA2000 1x evolution data and voice (1x EVDV) and CDMA2000 1x evolution data only (1x EVDO). The second phase is backward compatible with the first phase of CDMA2000 1x. As such, different hardware devices and software programs may be utilized in the base station 12 to provide services through CDMA2000 1x, which may include 1x legacy channels, and/or CDMA2000 1x EVDV, which may include EVDV high speed data channels. The interaction of these different phases of CDMA2000 is further explained in an exemplary embodiment of a base station 12, as shown in FIG. 2.

Before discussing the utilization of base station transmission power in the systems 14 and 16, it is useful to discuss the various components and communications channels 20a-20e for the wireless units 18a-18e in the exemplary wireless communications system 10. As can be seen in FIG. 2, an exemplary embodiment of a base station 12 that includes a baseband system 16 and an RF system 14 is shown. The wireless units 18a-18e establish signal paths or communications channels 20a-20e with the RF system 14. The base station 12 or RF system 14 may be assigned a set of communications channels 20a-20e from a portion of the radio frequency spectrum that is assigned to a particular wireless service, such as CDMA2000. The communications channels 20a-20e may include forward channels 24a-24e and reverse channels 26a-26e. The forward channels 24a-24e are signal paths from the base station 12 to the wireless unit 18a-18e. For instance, if the RF subsystem 14 utilizes CDMA2000, the forward channels 24a-24e may include one or more code channels that are transmitted on pilot channels to the wireless units 18a-18e. The forward channels 24a-24e may be produced by the base station 12 to communicate user and signaling traffic. The reverse channels 26a-26e may be signal paths from the wireless units 18a-18e to the base station 12. For instance, if the system utilizes CDMA, the reverse channels 26a-26e may also include one or more code channels. The reverse channels 26a-26e may be utilized to communicate data and signaling traffic from the wireless units 18a-18e to the base station 12. Through the use of these forward channels 24a-24e and reverse channels 26a-26e, the base station 12 and the wireless units 18a-18e communicate with each other.

The RF system 14 includes various hardware, such as an antenna 28 and a channel card 30 that are utilized to establish and maintain the communication with the wireless units 18a-18e through the communication channels 20a-20e. It should be understood that the antenna 28 may represent one or more antennas. Also, as noted above, the antenna 28 may communicate voice, video and/or data with any suitable wireless unit and may be positioned in a distributed or centralized configuration. The channel card 30 may include various hardware and software components that handle the communication for the RF system 14. Because the RF system 14 may support multiple technologies, e.g., TDMA, CDMA, FDMA, and GSM, the channel card 30 may include one or more transceiver units 32 that are dedicated for each technology or support multiple technologies in a single transceiver unit. The transceiver units 32 may be different sizes to provide different coverage footprints, such as macro, micro, pico, and nano. The channel card 30 may also include a forward supplemental channel discontinuous transmission (F-SCH DTX) module 34 and a forward supplemental channel (F-SCH) new burst module 36. The F-SCH DTX module 34 may predict the power to be utilized by the channel card 30, which may be predicted in advance of the usage by 2 power control groups (PCGs) or greater. The PCG is time interval that may be a 1.25 ms interval. Similarly, the F-SCH new burst module 36 may predict the power to be utilized by the channel card 30, which may also be 2 PCGs or greater.

A network 40 may be utilized to provide a communication path between baseband system 16 and the channel card 30 in the RF system 14. In the base station 12, the RF system 14 and the baseband system 16 may communicate over various layers or protocols and may interoperate over any physical or wireless layer in a Local Area Network ("LAN"), Server or Storage Area Network ("SAN"), Metropolitan Area Network ("MAN"), Wide Area Network ("WAN"), backplane, bus, or the like. Because the RF systems 14 may be centralized or distributed, the network 40 may include a variety of types of network architectures to provide communication paths between the RF systems 14 and the baseband system 16.

In this example, the baseband system 16 includes various components to operate and manage the communication with the wireless units 18a-18e and the RF system 14. For instance, the baseband system 16 includes a processor 42, such as a microprocessor, that controls many of the functions of the baseband system 16. Also, the baseband system 16 includes a communication module 44 that is utilized by the processor 42 to communicate via the network 40 to the RF system 14 or the PSTN 22. The communication module 44 may maintain communication paths between the baseband system 16 and the RF system 14 along with the PSTN 22.

Furthermore, various other components may also be coupled to the processor 42 to provide the functionality for the baseband system 16, as discussed above. For instance, the baseband system 16 may include a communication port 46 that is adapted to interact with a user interface 48. The user interface 48 may include buttons, switches, a keyboard, a light pen, a mouse, and/or other input devices, for instance. Also, a display 50 may be coupled to the processor 42 through the communication port 46. The display 50 may include, for example, a liquid crystal display (LCD), a cathode ray tube (CRT), and/or light emitting devices (LEDs).

Because the processor 42 controls the functioning of the baseband system 16, which is generally under the control of software programming, memory 54 is coupled to the processor 42 to store and facilitate the execution of software programs 56. The memory 54 may include dynamic random access memory (DRAM), static random access memory (SRAM), read-only memory (ROM), CD-ROM's, or other storage devices. As such, the memory 54 may be utilized by the processor 42 to store data 58 that may relate to the connections with the various wireless units 18a-18e. The data 58 may include signal energy information and antenna information that is related to the various communication channels 20a-20e, such as the forward channels 24a-24e and reverse channels 26a-26e.

In addition, a power system 60 may be coupled to the processor 42 to provide power or manage the power utilized by the RF system 14 and the baseband system 16. The power system 60 includes a power supply 62 that delivers power to components of the baseband system 16 and/or the RF system 14. The type of power supply 62 may vary depending on the source of the power. For instance, if the baseband system 16 is stored in a cabinet, the power supply 62 may include permanent batteries, replaceable batteries, and/or rechargeable batteries that are used along with an AC adapter, which may be plugged into a wall outlet. In addition, the power supply 62 may include a DC adapter or DC converter to modify the power received from telecommunications lines or other sources that provide DC power.

The power system 60 may also include an RF output power averaging module 64 and an instant RF output power module 66 that monitors the power supplied by the power system 60. The RF output power averaging module 64 may average the power utilized over a specific duration of time, which may be compared with the power overload threshold or setting. For instance, the RF output power averaging module 64 may determine whether the power usage exceeds 70% or 75% over a 5 PCG interval. The PCG is a 1.25 msec interval on a forward traffic channel of the forward channels 24a-24e and/or a reverse traffic channel on the reverse channels 26a-26e. The instant RF output power module 66 may determine the instantaneous base station transmission power utilized by the systems 14 and 16 for a specified period of time, such as 1 PCG. The modules 64 and 66 may be implemented as software routines or software programs 56, and/or as hardware components, such as a field programmable gate array (FPGA), a digital signal processor (DSP), an application specific integrated circuit (ASIC), or a combination of these hardware components.

To support the CDMA2000 1x service, a first baseband service system or a first wireless service system, such as a 1x system 68, may communicate with the processor 42 to handle the communication channels 20a-20e that utilize the 1x technology, and, more specifically, the forward channels 24a-24e. The 1x system 68 may include a power averaging module 70, an overload control module 72, a call admission module 74, and/or a supplemental channel (SCH) power module 76. The power averaging module 70 may receive signals from the RF output power averaging module 64 to determine the average power utilized by the 1x system. For instance, the power averaging module 70 may determine the average power over a 10 PCG interval for a short term aggregate overload control (STAOC) signal and over a 10 frame interval for a long term aggregate overload control (LTAOC) signal. A frame is a basic timing interval that may include different durations, such as a 20 ms duration for a forward supplemental channel (F-SCH). The overload control module 72 may measure the power overload for each PCG. The call admission module 74 may manage the establishment of communication channels 20a-20e, such as the forward channels 24a-24e, for a wireless device 18a-18e, while the SCH power module 76 may manage the transmissions of supplemental channel over the communications channels communication channels 20a-20e. By utilizing these different modules 70-76, the 1x system 68 may provide power management for the CDMA2000 1x service. Further, it should be noted that the 1x system 68 or the modules 70-76 may be implemented as software programs, such as individual or combined software routines, or as hardware components, such as a FPGA, a DSP, an ASIC, or a combination of these components.

Furthermore, to support the CDMA2000 1x EVDV service, a second baseband service system or a second wireless service system, such as an EVDV system 78, may also communicate with the processor 42 to handle the communication channels 20a-20e, which may include forward channels 24a-24e. The EVDV system 78 may include an EVDV scheduler 80, a power frame averaging module 82, a transmission module 84, and/or a power sharing module 86. The scheduler or EVDV scheduler 80 may allocate the power for transmissions to the wireless units 18a-18e for the EVDV system 78. The power frame averaging module 82 may determine the EVDV average transmission power based on a signal from the power sharing module 86. The power frame averaging module 82 may determine an average power utilized by the EVDV system 78 over a frame and provide an output signal to the call admission module 74, which may be delayed by about 3 or 4 PCGs. Also, the transmission module 84 may forward the EVDV signals to the channel card 30 for transmission and provide input information to the instant RF output power module 66. The power sharing module 86 may be utilized by the EVDV scheduler 80 to determine the un-utilized power that may be allocated to the EVDV system 78. This unutilized power may be indicated to the EVDV scheduler 80 in a control signal. The power sharing module 86 may include a power sharing algorithm that receives signals from various other modules and systems to determine the power to be utilized by the 1x and EVDV systems 68 and 78. For instance, the overload control module 72 may provide a power scaling signal PSS, the F-SCH DTX module 34 and a F-SCH new burst module 36 may provide a channel card signal $P_{1xSCH}$, and/or the RF output power averaging module 64 may provide a RF power average signal RFAVG. Further, it should be noted that the EVDV system 78 or the modules 80-86 may be implemented as software programs, such as individual or combined routines, or as hardware components, such as a FPGA, a DSP, an ASIC, or a combination of these components. By utilizing these different modules 80-86, the EVDV system 78 may provide power management for the CDMA2000 1x EVDV services along with the CDMA2000 1x services.

With the base station 12 configured to provide the CDMA2000 1x and 1x EVDV services, the sharing of transmission power on the forward channels 24a-24e are managed by the EVDV scheduler 80. The power may be allocated within the baseband system 16 based on a power sharing priority. As an example of the power sharing priority, the forward channels 24a-24e may have a priority order scheme, which may follow the order of 1x overhead channels, a forward common power control channel (F-CPCCH), a forward fundamental channel (F-FCH), a forward supplemental channel (F-SCH) that time shares with a forward packet data control channel (F-PDCCH) and a forward packet data channel (F-PDCH). The F-CPCCH may transmit power control messages to the wireless units 18a-18e, while the F-FCH and F-SCH are portions of forward traffic channels that carry a combination of higher-level data and power control information. The F-PDCCH may provide broadcast information to the wireless units 18a-18e, while the F-PDCH may be a code division multiplex packet shared between different wireless units 18a-18e. Based on the priority order scheme, the EVDV scheduler 80 may allocate non-utilized power indicated by the power sharing module 86 from the 1x system 68 to F-FDCCH and F-PDCH of the EVDV system 78.

In operating the base station 12 with multiple systems 68 and 78, the EVDV system 78 may modify the power allocations more often than the 1x system 68. For instance, the EVDV system 68 may modify the power allocations once every two PCGs, while the 1x system 68 may modify power allocations within a longer time interval. Because of the dynamic changes in the 1x channel transmission power delay, the EVDV scheduler 80 may inappropriately allocate power to the forward channels 24a-24e. This over allocation may cause power overloading or power underutilization in the 1x and EVDV systems 68 and 78.

Accordingly, the EVDV system 78 may utilize the power sharing module 86 to compensate for a variety of factors to maintain the appropriate power allocation within the base station 12. For instance, the power sharing module 86 may minimize 1x overloads, prevent delays for 1x call admissions, prevent the blocking of soft handoffs, and minimize the dropping of calls for voice or dropping of packets for data. Also, the power sharing module 86 may monitor the F-SCH in the 1x system 68, which may dynamically vary the power utilized for transmissions. By incorporating these various factors, the power sharing module 86 may indicate to the EVDV scheduler 80 the appropriate amount power that may be utilized or whether the power from the 1x system 68 may be utilized.

To receive the information about the power usage in the base station 12, the power sharing module 86 may receive input signals from other modules. The power sharing module 86 may utilize these signals to overcome the inappropriate allocation of transmission power between the 1x system 68 and EVDV system 78 by predicting the power to be utilized by the 1x system 68. This allows the EVDV scheduler 80 to incorporate the upcoming transmission power requirements and allocate the un-utilized power to the EVDV forward channels, such as F-PDCCH and F-PDCH, which are a portion of the forward channels 24a-24e. The input signals may include the channel card signal $P_{1xSCH}$, the power scaling signal PSS, and/or RF power average signal RFAVG. With these signals, the power sharing module 86 may provide the EVDV scheduler 80 with upcoming transmission requirements to minimize the overloading conditions to a tolerable level. As a result, the power sharing module 86 may provide the flexibility to maintain the overload settings and maximize the throughput of the base station 12 through the utilization of un-allocated power. The time intervals associated with the scheduling and RF output power averaging in the base station 12 is further explained in FIG. 3.

Figure 3:
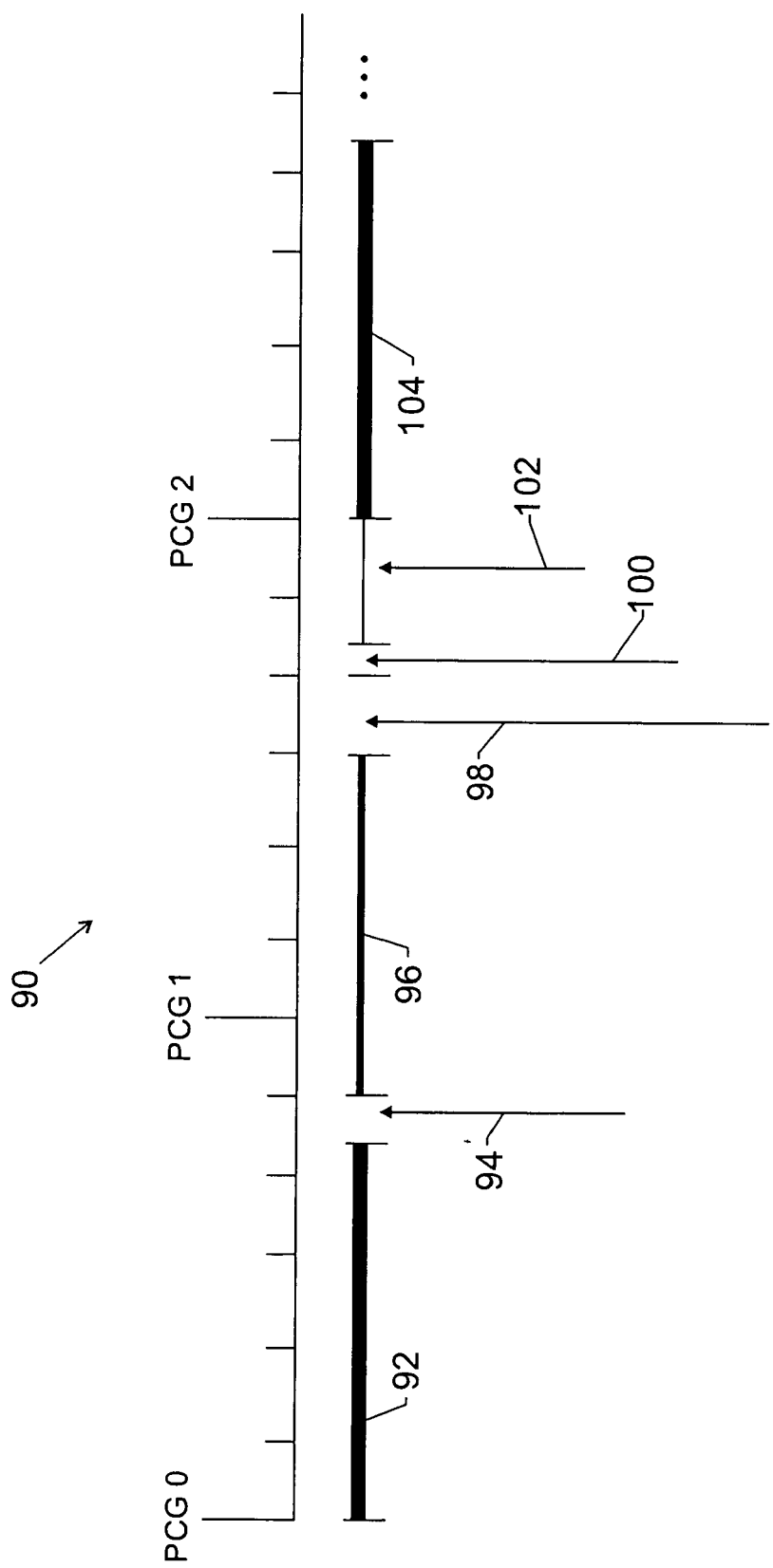
FIG. 3 illustrates a timing chart of the RF output power averaging and scheduling in the EVDV system of FIG. 2 in accordance with an embodiment of the present invention.

In FIG. 3, a timing chart of the RF output power averaging and scheduling in the EVDV system 78 of FIG. 2 is shown. In the timing chart 90, each of the PCGs are divided into 6 walshes, which are about equal to 0.2083 ms. The first RF output power averaging interval 92 may represent the time interval that the RF output power averaging module 64 utilizes to calculate the RF output power average, which results in the RF power average signal RFAVG. A delay interval 94 may represent the time interval associated with transmitting the RF power average signal RFAVG to the power sharing module 86. Once the RF output power average is determined, the power sharing module 86 may indicate to the EVDV scheduler 80 the power to be allocated to the various forward channels associated with the forward channels 24a-24e, which is represented by a scheduling interval 96. The scheduling interval 96 may utilize a time period of about 5 walshes to calculate the power allocation. Once the scheduling of the EVDV transmission power is complete, a baseband processing interval 98, a random delay interval 100, and a RF delay 102 may be present. However, after these intervals 98-102, the RF output power averaging may be recalculated during the second RF output power averaging interval 104. Accordingly, the process is repeated during a 2 PCG interval.

Beneficially, as shown in the timing chart 90, the EVDV system 78 may modify the power allocations within a 2 PCG interval to correct inappropriate power allocations. In contrast, the 1x system 68 generally utilizes a longer time interval to correct power allocations. As a result, the EVDV system 78 may correct the power allocations before the 1x system 68 may adjust the power scaling. This means that the EVDV system 78 may cause short term overloading of about 1 dB, but the overload is limited to a 2 PCG interval and may not result in a power scaling signal. Thus, the EVDV system 78 may maintain operation of the 1x system 68 by minimizing 1x overloads, preventing delays for 1x call admissions, preventing the blocking of soft handoffs, and minimizing the dropping of calls for voice or dropping of packets for data. The forward looking aspects of the power sharing module 86 is further explained in the exemplary embodiment of the power sharing module 86 in FIG. 4.

Figure 4:
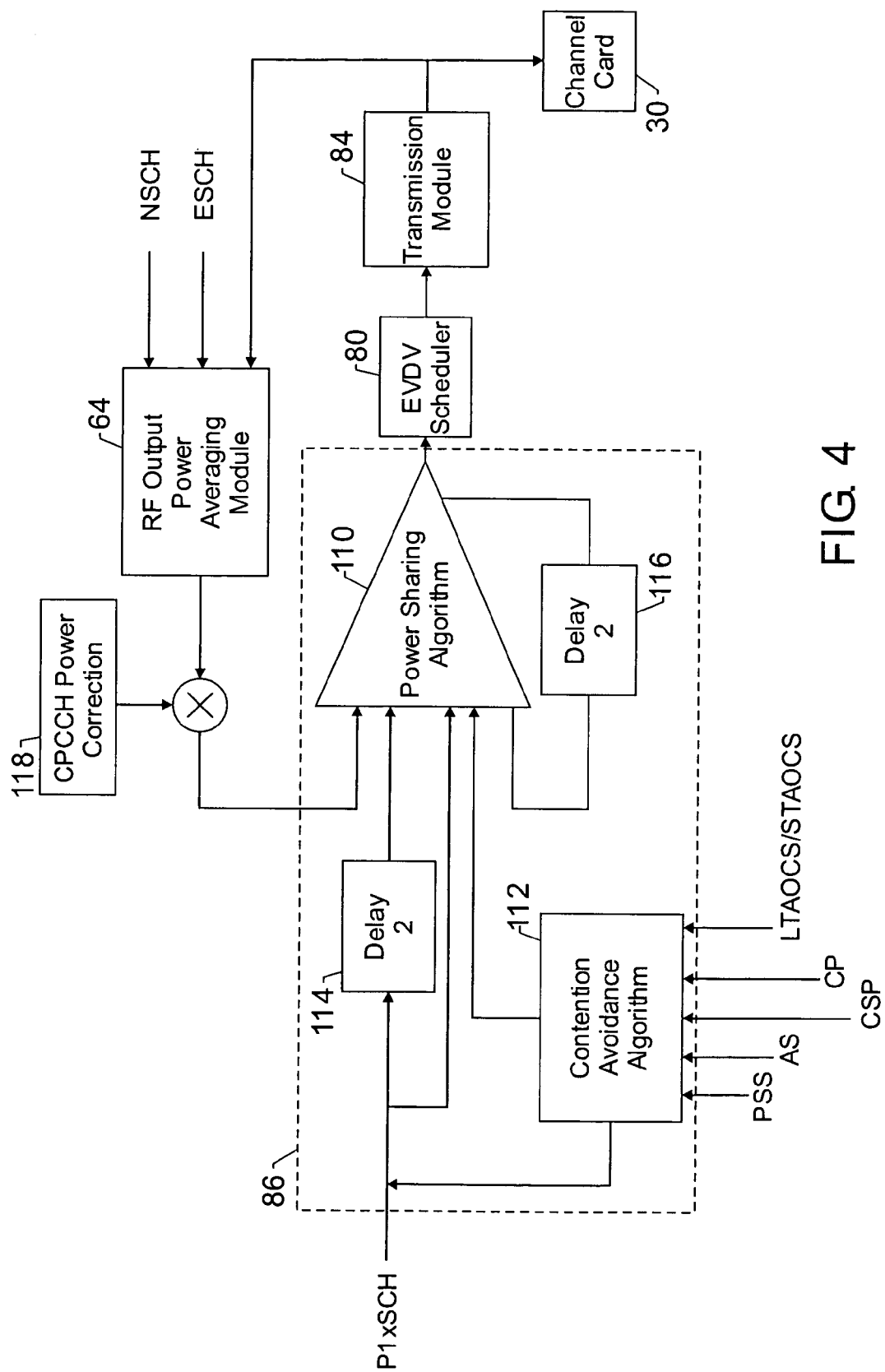
FIG. 4 illustrates a block diagram of an exemplary embodiment of a power sharing module associated with the EVDV system in accordance with an aspects of the present invention.

FIG. 4 is a block diagram of an exemplary embodiment of a power sharing module 86 utilized in the EVDV system 78 in accordance with an aspects of the present invention. The power sharing module 86 may be utilized by the EVDV scheduler 80 to determine the power available for allocation for the EVDV forward channels. The power sharing module 86 may utilize a power sharing algorithm 110 and a contention avoidance algorithm 112 that receive input signals from various modules, such as the overload control module 72, the F-SCH DTX module 34, the F-SCH new burst module 36, and the RF output power averaging module 64. From these input signals, the power sharing algorithm 110 may calculate the un-allocated power that may be utilized by the EVDV system 78 for transmissions to the wireless units 18a-18e.

The power sharing module 86 may receive input signals from the various other modules within the base station 12 to adjust the EVDV power allocations for the EVDV scheduler 80. For instance, the F-SCH DTX module 34 and the F-SCH new burst module 36 may provide a channel card signal $P_{1xSCH}$. The channel card signal $P_{1xSCH}$ may represent the 1x SCH DTX and new burst power status signals, which may be about 2 PCG ahead of the power used by the F-SCH DTX module 34 and the F-SCH new burst module 36. The channel card signal $P_{1xSCH}$ may be provided to the power sharing algorithm 110 directly, which may be represented by a direct channel card signal $P_{1xSCH}[2]$, and through a 2 PCG delay 114, which may be represented by delayed channel card signal $P_{1xSCH}[0]$. In addition, the direct channel card signal $P_{1xSCH}[2]$ may be provided to the contention avoidance algorithm 112, which is discussed below.

The contention avoidance algorithm 112 may receive various input signals and provide an adaptive power margin signal $P_{MARG}$ to compensate for the power uncertainty associated with the supplemental power utilized by the 1x system 68. Because the 1x system 68 may allocate power in steps of 1 dB to adjust the power allocations, the power adjustments may be indicated by the contention avoidance algorithm 112 to reduce the probability that the EVDV system 78 utilizes too much power. Accordingly, the contention avoidance algorithm 112 may utilize input status signals from various sources to calculate the adaptive power margin signal $P_{MARG}$. For instance, the direct channel card signal $P_{1xSCH}[2]$ may be provided from the F-SCH DTX module 34 and the F-SCH new burst module 36, while the power scaling signal PSS may be provided from the overload control module 72. Similarly, a long term AOC signal LTAOCS and a short term AOC signal STAOCS may be provided from the power averaging module 70. In addition, various settings or configurations may be received at the contention avoidance algorithm 112, as well. The settings may include translations or customer set parameters CSP, channel parameters CP, and/or amplifier specifications AS. The amplifier specifications AS may be set for certain time intervals, such as 2.5 ms, 5, ms, 10 ms, 30 ms, 1 sec, or 3 sec. By combining these various input signals, the contention avoidance algorithm 112 may provide the adaptive power margin signal $P_{MARG}$ to the power sharing algorithm 110, which reduces the overloading of the system by the EVDV system 78.

In addition, a total power signal $P_{RF}$ may also be provided to the power sharing algorithm 110 from the RF output power averaging module 64 and a F-CPCCH power correction logic 118. The total power signal $P_{RF}$ may represent the combination of the RF power average signal RFAVG from the RF output power averaging module 64 and a F-CPCCH power correction signal PCS from the F-CPCCH power correction logic 118. The RF power average signal RFAVG may represent a combination of the total power utilized by the 1x system 68 and the EVDV system 78. The RF power average signal RFAVG may be a combination of a 1x non-SCH power signal NSCH that represents the power allocated to non-supplemental channel power, an existing SCH power ESCH that represents existing supplemental channel power, and an EVDV power signal EPS that represents the power allocated to the EVDV system 78 for transmission of the EVDV channels through the EVDV transmission module 84. The F-CPCCH power correction signal PCS may represent an RF power average adjustment. As such, the total power signal $P_{RF}$ may represent the total power allocated by the 1x system 68 and the EVDV system 78.

With these various input signals, the power sharing algorithm 110 may provide an indication to the EVDV scheduler 80 that relates to the amount of power scheduled for transmission by the 1x system 68 and the EVDV system 78. The power sharing algorithm 110 may be represented by the formula:

$$P_{EVDVSCH}[1] = P_{MAX} - (P_{RF}[0] - P_{EVDVSCH}[-1]) - \Delta P_{1xSCH}[0,2] - P_{MARG}$$

In this power sharing algorithm 110, the EVDV scheduled power $P_{EVDVSCH}$ represents the power scheduled for transmissions for the EVDV system 78. The predicted EVDV scheduled power $P_{EVDVSCH}[1]$ indicates that the predicted power for the EVDV transmission, which is 1 PCG ahead of the current EVDV transmissions. A previous EVDV scheduled power $P_{EVDVSCH}[-1]$ may be provided through the delay 116, such as a 2 PCG delay, which represents the power utilized for the EVDV transmission 1 PCG before the current EVDV transmission. The maximum power allowed by the 1x system and the EVDV system 78 may be represented by $P_{MAX}$, which may be the overload setting of 70% or 75% of the total available power, for example. As discussed above, other input signals may be provided to the power sharing algorithm 110 with predicted transmission usage by the 1x system 68 and the EVDV system 78 and other power usage information. With these input signals, the power sharing algorithm 110 may modify the power allocations within a 2 PCG interval to adjust power allocations. As such, the power sharing algorithm 110 may modify the power allocations before the power averaging module 70 of the 1x system 68 may modify the power allocations. Thus, the power scaling of the power averaging module 70 may be utilized when there is insufficient EVDV power to be removed to correct the overloading condition, not because of an inappropriate allocation of power by the EVDV scheduler 80.

The predicted EVDV scheduled power $P_{EVDVSCH}[1]$ may be provided to the EVDV scheduler 80 to modify the EVDV transmissions. Accordingly, the power sharing algorithm 110 may reduce the uncertainty associated with the 1x system 68 and reduce power scaling situations. Also, an overload by the EVDV system 78 may be confined within a 2 PCG interval to manage the power margins before the 1x system 68 may respond to the power allocation. As such, the EVDV scheduler 80 may allocate un-utilized power for EVDV forward channels through the transmission module 84, which may provide the baseband processing and transmission to the appropriate channel card 30.

Beneficially, the power sharing algorithm 110 may remove the uncertainty associated with the EVDV system's allocation of power for transmissions. The power sharing algorithm 110 may be utilized to reduce the overloading situations to about 1 dB for about 2 PCGs. This management of the overload conditions may allow the EVDV system 78 to utilize un-allocated power without harming the 1x system 68 and maintaining the requirements associated with the 1x system 68 for new calls. Accordingly, the 1x system 68 may still allocate the power, which was utilized by the EVDV system 78, to a new call based on the priority between the 1x system 68 and the EVDV system 78, which may be set by translation or customer settings.

It should be understood that the power sharing module is merely an example of a hardware module or software routine that may be designed using the techniques described herein. Indeed, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

What is claimed is:

1. A device for allocating power comprising:
a power sharing module configured to receive a plurality of signals corresponding to at least one predicted power allocation and at least one current power allocation and to determine from the plurality of signals whether a first industry standard wireless system corresponding to a first wireless service has un-utilized transmission power;
a scheduler configured to receive an indication to allocate the un-utilized transmission power from the first wireless service of the first industry standard wireless system to a second wireless service of a second industry standard wireless system and utilize the indication to allocate the un-utilized transmission power for the second wireless service;
wherein the first industry standard wireless system and the second industry standard wireless system are distinct industry standard wireless systems, and wherein the indication to allocate the un-utilized transmission power is based on subtracting from an overload setting:
  a current total power utilized by the first industry standard wireless system and the second industry standard wireless system minus the scheduled power in a previous time interval;
  a delta between a current supplemental power and a predicted supplemental power for the first industry standard wireless system; and
  a marginal power that comprises at least one parameter setting.

2. The device, as set forth in claim 1, wherein the first wireless service comprises a CDMA2000 1x service.

3. The device, as set forth in claim 2, wherein the first industry standard wireless system comprises a 1x system.

4. The device, as set forth in claim 1, wherein the second wireless service comprises a CDMA2000 1x evolution data and voice (EVDV) service.

5. The device, as set forth in claim 4, wherein the second industry standard wireless system comprises an EVDV system.

6. The device, as set forth in claim 1, wherein the power sharing module provides the scheduler with the indication to allocate the un-utilized transmission power within a 2 power control group interval.

7. A base station comprising:
  a radio frequency system having a channel card configured to communicate with a plurality of wireless units; and
  a baseband system comprising:
    a first baseband system that communicates with a first group of the plurality of wireless units via a first plurality of communication channels; and
    a second baseband system that communicates with a second group of the plurality of wireless units via a second plurality of communication channels, the second baseband system comprising:
      a power sharing module configured to receive a plurality of signals corresponding to a plurality of predicted power allocation and a plurality of current power allocations and to determine from the plurality of signals whether the second baseband system may allocate power from the first baseband system;
      a scheduler configured to receive an indication to allocate un-utilized transmission power to the second baseband system from the first baseband system and to utilize the indication to allocate un-utilized transmission power for the second plurality of communication channels;
    wherein the first baseband system and the second baseband systems are distinct baseband systems, and wherein the indication to allocate the un-utilized transmission power is based on subtracting from an overload setting:
      a current total power utilized by the first industry standard wireless system and the second industry standard wireless system minus the scheduled power in a previous time interval;
      a delta between a current supplemental power and a predicted supplemental power for the first industry standard wireless system; and
      a marginal power that comprises at least one parameter setting.

8. The base station, as set forth in claim 7, comprising a power system that determines a radio frequency output power average and an instant radio frequency power, the power system being configured to provide power for transmissions from the first baseband system to the first group of the plurality of wireless units and from the second baseband system to the second group of the plurality of wireless units.

9. The base station, as set forth in claim 7, wherein the channel card comprises at least one transceiver configured to communicate with the plurality of wireless units.

10. The base station, as set forth in claim 7, wherein the first baseband system is a 1x system that provides CDMA2000 1x service to the first group of the plurality of wireless units.

11. The base station, as set forth in claim 7, wherein the second baseband system is an evolution data and voice (EVDV) system that provides CDMA2000 1xEVDV service to the second group of the plurality of wireless units.

12. A method for allocating transmission power comprising:
  providing a first industry standard wireless system and a second industry standard wireless system for a plurality of wireless units;
  obtaining a plurality of input signals corresponding to a plurality of predicted transmission power allocations and a plurality of current transmission power allocations;
  determining from the plurality of input signals whether the second industry standard wireless system may utilize transmission power from the first standard wireless system;
  allocating transmission power to the second industry standard wireless system from the first industry standard wireless system for at least one communication channel based on an indication of transmission power that is un-utilized by the first industry standard wireless system;
  wherein the first industry standard wireless system and the second industry standard wireless system are distinct industry standard wireless systems, and wherein the indication of transmission power that is un-utilized is based on subtracting from an overload setting:
    a current total power utilized by the first industry standard wireless system and the second industry standard wireless system minus scheduled power in a previous time interval;
    a delta between a current supplemental power and a predicted supplemental power for the first industry standard wireless system; and
    a marginal power that comprises at least one parameter setting.

13. The method, as set forth in claim 12, wherein providing the first industry standard wireless system comprises providing a CDMA2000 1x service to a first portion of the plurality of wireless units.

14. The method, as set forth in claim 13, wherein providing the second industry standard wireless system comprises providing a CDMA2000 1x evolution data and voice (EVDV) service to a second portion of the plurality of wireless units.

15. The method, as set forth in claim 14, comprising transmitting the at least one communication channel to at least one of the second portion of the plurality of wireless units.

16. The method, as set forth in claim 12, wherein the plurality of wireless units comprises a plurality of cellular telephones.

17. The method, as set forth in claim 12, wherein the plurality of wireless units comprises at least one portable computer system.

18. A method for allocating power, the method comprising the acts of:

receiving a plurality of input signals corresponding to at least one predicted power allocation for a first industry standard wireless system and at least one current power allocation for the first industry standard wireless system and a second industry standard wireless system;

determining from the plurality of input signals whether non-utilized transmission power from the first industry standard wireless system may be allocated to the second industry standard wireless system;

providing an indication to allocate non-utilized transmission power from the first industry standard wireless system to the second industry standard wireless system to a scheduler;

wherein the first industry standard wireless system and the second industry standard wireless system are distinct industry standard wireless systems, and wherein the indication to allocate non-utilized transmission power is based on subtracting from an overload setting:

a current total power utilized by the first industry standard wireless system and the second industry standard wireless system minus the scheduled power in a previous time interval;

a delta between a current supplemental power and a predicted supplemental power for the first industry standard wireless system; and a marginal power that comprises at least one parameter setting.

19. The method, as set forth in claim 18, comprising the act of allocating the non-utilized transmission power based on the indication to allocate non-utilized transmission power from the first industry standard wireless system to the second industry standard wireless system for transmissions to a wireless unit.

20. The method, as set forth in claim 18, wherein the at least one communication channel comprises a CDMA2000 1x evolution data and voice (EVDV) communication channel.

* * * * *